United States Patent Office 3,657,228
Patented Apr. 18, 1972

---

3,657,228
PROCESS FOR THE MANUFACTURE OF
3β-HYDROXY-5β-CARDENOLIDES
Kurt Radscheit, Kelkheim, Taunus, Werner Fritsch, Neuenhain, Taunus, and Werner Haede and Ulrich Stache, Hofheim, Taunus, Germany, assignors to Farbwerke Hoechst Aktiengesellschaft vormals Meister Lucius & Bruning, Frankfurt am Main, Germany
No Drawing. Filed Nov. 12, 1970, Ser. No. 89,098
Claims priority, application Germany, Nov. 14, 1969,
P 19 57 264.4
Int. Cl. C07c 173/00
U.S. Cl. 260—239.57
1 Claim

---

ABSTRACT OF THE DISCLOSURE

Manufacture of 3β-hydroxy-5β-cardenolides of the 14-dehydro or 14β series by treatment of 3-keto-5β-cardenolides with iridium(IV)-hydrochloric acid, its salts or iridium(III)-chloride in the presence of trialkyl-phosphite.

---

Belgian Pat. No. 707,326 describes a process for the manufacture of 3β-hydroxy-5β-cardenolides, wherein 3-keto-5β-cardenolides are first reduced by means of complex metal hydrides to yield the corresponding 3α-hydroxy-compounds and the latter are converted by Walden inversion into the 3β-cardenolides.

It has also been proposed to prepare 3β-hydroxy-5β-cardenolides by reducing 3-keto-5β-cardenolides by means of aluminium alcoholate according to Meerwein-Ponndorf and separating the 3α-hydroxy-cardenolides that have formed simultaneously in about the same quantity, dehydrogenating them again to obtain 3-keto-5β-cardenolides, whereupon these may be subjected again to the Meerwein-Ponndorf reduction.

The present invention provides a simple and smoothly proceeding process for the manufacture of 3β-hydroxy-5β-cardenolides of the 14-dehydro- or 14β-series, wherein corresponding 3-keto-5β-cardenolides are treated with iridium(IV)-hydrochloric acid, its alkali metal or ammonium salts or iridium(III)-chloride in the presence of trialkyl phosphite and lower alcohols.

The process proceeds, for example, according to the following reaction scheme:

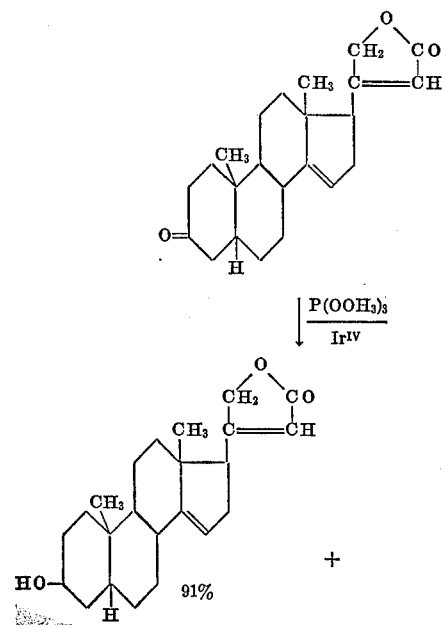

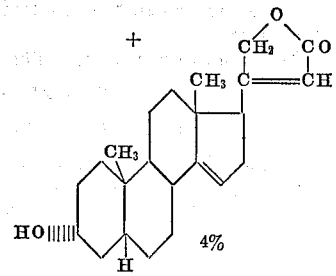

As starting substances, for example 3-keto-5β-carda-14,20(22)-dienolide or 3-keto-14β-hydroxy-5β-card-20(22)-enolide may be used.

The reduction is effected in the usual manner by heating the 3-keto-5β-cardenolide with the soluble iridium (III)- or (IV)-salt, of which catalytic amounts are preferably used, in a low molecular alcohol in the presence of trialkyl phosphite, for a prolonged period of time, i.e. for about 1 to 5 days, preferably for 50 to 150 hours, under reflux to the boiling temperature. As lower alcohols, it is advantageous to use propanol-2 which may advantageously contain up to 10% of water. As trialkyl phosphite, it is advantageous to use trimethyl phosphite, at least in a stoichiometrical amount. It is possible to operate with or without addition of a small amount of mineral acid. If iridium(III)-chloride is used for derivatives of the 14-dehydro series, the addition of a small amount of concentrated hyrochloric acid is of advantage.

The 3-keto-5β-cardenolide to be reduced may be added to the reducing mixture either immediately or after some hours (up to 15 hours). When the reaction is complete, the reaction mixture is removed from the aqueous solution, for example by filtration with suction or extraction with organic solvents.

The advantage of the process of the invention over the process described in Belgian Pat. No. 707,326 resides in the fact that several reaction stages can be omitted. In the known process, first the reduction is effected, then the esterification is carried out with p-toluene-sulfochloride and the resulting compound is then rearranged (Walden inversion) with potassium formate. The total yield is about 40%. In contradistinction thereto, in the process of the invention the reaction with p-toluene-sulfochloride and the subsequent Walden inversion are not necessary and the yields obtained are higher than 90%.

The reduction of 3-keto-androstane- and 3-keto-pregnane derivatives to the corresponding axial 3β-hydroxy compounds with iridium(IV)-hydrochloric acid is described in J. Chem. Soc. (C)(1969), pages 1653–1659. In the light of this literature reference, the application of the same reducing agent to steroids which contain the sensitive α,β-unsaturated lactone ring appeared very questionable. As regards the known reaction, only the reduction of saturated keto-steroids had been described, thus an undesired action of the reagent on double bonds, for example on those in the 14,15-position of steroids, had to be expected. For example, a partial conversion of the thermodynamically unstable cardenolides of the 14-dehydro- or 14β-series into the more stable 8(14)- or 8(9)-dehydro-cardenolides or -isocardenolides could have taken place. In addition, it is known from the mentioned literature reference that, for example pregnane-20β-ol or 21-hydroxy-pregnane-20-one is attacked by the reagent in a partly unsurveyabel manner. The lateral chain of pregnane-20-one, on the other hand, undergoes epimerization in the 17-position.

The process according to the invention permits, in unexpected manner, the manufacture in a smooth reaction and with good yields of derivatives of the important 3β- series of the digitoxigenin steroids; there is obtained, in the 14β-hydroxy series, either directly the highly cardioactive digitoxigenin or its pre-stage, i.e. the 14,20(22)-dienolide which can be converted by known processes into digitoxigenin.

The following examples illustrate the invention:

EXAMPLE 1

3β-hydroxy-5β-carda-14,20(22)-dienolide 20 ml. of trimethyl-phosphite and 500 mg. of iridium-(IV)-hydrochloric acid were introduced into a stirred suspension of 10 g. of 3-keto-5β-carda-14,20(22)-dienolide in 250 ml. of 90% propanol-2. The reaction mixture was then heated for 62 hours to the boil, while stirring and cooling of the reflux. After 49 hours, the whole starting material had dissolved. At the end of the total reaction time, the clear almost colorless solution was stirred into 1 liter of water. The reaction product that had precipitated was filtered off with suction, washed with water and taken up in methylene chloride. After washing with water and drying over sodium sulfate, it was concentrated to dryness under reduced pressure. After recrystallization from a mixture of methylene chloride and methanol, 9.15 g. of 3β-hydroxy-5β-carda-14,20(22)-dienolide melting at 195–199° C. (corrected) were obtained. $[\alpha]_D = -28°$; $[\alpha]_{365} = -160°$ (chloroform 0.5%).

About 400 mg. (=4%) of 3α-hydroxy-5β-carda-14,20-(22)-dienolide melting at 196° C. could be obtained from the mother liquors by chromatography.

EXAMPLE 2

3β,14β-dihydroxy-5β-carda-20(22)-enolide
(Digitoxigenin)

10 ml. of trimethyl-phosphite and 250 mg. of iridium-(IV)-hydrochloric acid were introduced into a solution of 5.0 g. of 3-keto-14β-hydroxy-5β-card-20(22)-enolide in 250 ml. of propanol-2 (90% strength). The reaction mixture was then heated for 140 hours to the boil under reflux. It was then cooled rapidly and stirred into 400 ml. of water and extracted with chloroform. The extract was washed with water until neutrality, dried over sodium sulfate and concentrated to dryness under reduced pressure. After recrystallization from a mixture of acetone and petroleum ether, 4.25 g. of digitoxigenin were obtained. Melting point: 240–242° C. $[\alpha]_D = 18.1°$ (in $CHCl_3$).

What we claim is:

1. Process for the manufacture of 3β-hydroxy-5β-cardenolides of the 14-dehydro- or 14β-series, wherein corresponding 3-keto-5β-cardenolides are treated with iridium(IV)-hydrochloric acid, its alkali metal or ammonium salts or iridium(III)-chloride in the presence of trialkylphosphite and lower alcohols.

References Cited

Jour. Chem. Soc. (1969), pp. 1653–1659.

ELBERT ROBERTS, Primary Examiner